United States Patent

Richardson et al.

[15] 3,700,777

[45] Oct. 24, 1972

[54] MODIFICATION OF ENDOCRINE STATUS WITH HYDRAZINE DERIVATIVES

[72] Inventors: Dora Nellie Richardson; Arthur Leonard Walpole, both of Macclesfield; George Edward Paget, Welwyn Garden City, all of England

[73] Assignee: Imperial Chemical Industries Limited, London, England

[22] Filed: Aug. 8, 1969

[21] Appl. No.: 851,143

Related U.S. Application Data

[63] Continuation-in-part of Ser. No. 32,589, May 31, 1960, abandoned, and a continuation of Ser. No. 378,966, June 29, 1964, abandoned.

[30] Foreign Application Priority Data

June 17, 1959  Great Britain........20,758/59
Nov. 23, 1959  Great Britain...........39627/59

[52] U.S. Cl.................................................424/323

[51] Int. Cl. .............................................A61k 27/00
[58] Field of Search.......................................424/323

[56] References Cited

OTHER PUBLICATIONS

Busch et al., J. Prakt. Chem. Vol. 90 (1914) pages 257– 259, 262, 265, 266, 269– 271
Preisler – J.A.C.S. Vol. 71 (1949) pages 2849– 2852

*Primary Examiner*—Sam Rosen
*Attorney*—Cushman, Darby & Cushman

[57] ABSTRACT

The disclosure relates to pharmaceutical and veterinary compositions containing as active ingredient at least one $N^1,N^2$-dithiocarbamoylhydrazine derivative, and to a method for using such compounds for the modification of the endocrine status in humans and in animals. Typical of the active ingredients used is $N^1$-α-methylallylthiocarbamoyl-$N^2$-methylthiocarbamoylhydrazine.

19 Claims, No Drawings

MODIFICATION OF ENDOCRINE STATUS WITH HYDRAZINE DERIVATIVES

This application is a continuation-in-part of our application Ser. No. 32,589 filed May 31, 1960 now abandoned and a continuation of application Ser. No. 378,966 filed June 29, 1964, now abandoned.

This invention relates to pharmaceutical and veterinary compositions containing hydrazine derivatives which are valuable for the modification of the endocrine status in humans and in animals.

According to the invention we provide pharmaceutical and veterinary compositions which comprise as active ingredient at least one hydrazine derivative of the formula:

wherein of the substituents $R_1$, $R_2$, and $R_3$, one is selected from the group consisting of alkyl of up to four carbon atoms and alkenyl of up to six carbon atoms, and of the remaining two substituents, one is selected from the group consisting of hydrogen, alkyl of up to four carbon atoms, alkenyl of up to six carbon atoms, benzyl, chlorobenzyl, methoxybenzyl, cyclohexyl, gamma-methoxy-n-propyl and gamma-methylthio-n-propyl, and the other is selected from the group consisting of alkyl of up to four carbon atoms, alkenyl of up to six carbon atoms, benzyl, chlorobenzyl, methoxybenzyl, cyclohexyl, gamma-methoxy-n-propyl and gamma-methylthio-n-propyl, provided that when $R_2$ stands for hydrogen and $R_1$ has a value chosen from methyl, ethyl and allyl, $R_3$ is different from $R_1$ and provided further that when $R_1$ is methyl and $R_2$ is hydrogen, $R_3$ is other than allyl, in admixture with a diluent or carrier therefor.

As suitable values of alkyl of up to 4 carbon atoms, i.e., alkyl of 1 to 4 carbon atoms, there may be mentioned, for example, methyl, ethyl, n-propyl, iso-propyl, n-butyl, sec-butyl, iso-butyl and tertiary-butyl radicals.

As suitable values of alkenyl of up to six carbon atoms there may be mentioned, for example, allyl, $\alpha$-methylallyl (2-but-3-enyl), $\beta$-methylallyl, $\gamma$-methylallyl, but-3-enyl, $\alpha$-ethylallyl, $\gamma$-ethylallyl, $\alpha$-n-propylallyl, $\gamma$-n-propylallyl, $\alpha$:$\gamma$-dimethylallyl, $\alpha$-ethyl-$\beta$-methyl-allyl and pent-4-enyl radicals i.e., alkenyl of three to six carbon atoms.

Preferred hydrazine derivatives which can be used as active ingredient or ingredients in the compositions of the invention are those hydrazine derivatives defined above wherein, 1. $R_1$ stands for an alkenyl radical of up to six carbon atoms, $R_2$ stands for hydrogen and $R_3$ stands for an alkyl radical of up to four carbon atoms, or
2. $R_1$ stands for an alkenyl radical of up to six carbon atoms and $R_2$ and $R_3$ both stand for alkyl radicals, each containing up to four carbon atoms, or
3. $R_1$ stands for hydrogen and $R_2$ and $R_3$ both stand for alkenyl radicals, each containing up to six carbon atoms, or
4. $R_1$ stands for an alkyl radical of up to four carbon atoms, $R_2$ stands for hydrogen and $R_3$ stands for a tertiary butyl radical.

Particular hydrazine derivatives which are preferred for use as the the active ingredient or ingredients in the compositions of the invention are $N^1$-$\alpha$-methylallyl-thiocarbamoyl-$N^2$-methylthiocarbamoylhydrazine, $N^1$-$\beta$-methylallylthiocarbamoyl-$N^2$-methylthiocarbamoyl-hydrazine, $N^1$-$\gamma$-methylallylthiocarbamoyl-$N^2$-methylthiocarbamoyl-hydrazine, $N^1$-allylthiocarbamoyl-$N^2$, $N^2$-dimethylthio-carbamoylhydrazine and $N^1$-allylthiocarbamoyl-$N^2$-ethyl-thiocarbamoyl-hydrazine.

The hydrazine derivatives used as active ingredient or ingredients in the compositions of the invention may be obtained in the manner described in Ser. No. 32,589 by the interaction of an isothiocyanate of the formula $R_1$·NCS and a thiosemicarbazide derivative of the formula $H_2N$·NH·CS·$NR_2R_3$ wherein $R_1$, $R_2$, and $R_3$ have the meanings stated above.

The pharmaceutical and veterinary compositions may be in the form suitable for oral use or for parenteral use. Oral compositions may be for example in the form of tablets, capsules, solutions or suspensions in aqueous media or in non-toxic organic solvent media, dispersible powders suitable for the preparation of liquid suspensions, mixtures with animal foodstuffs or pre-mix compositions suitable for addition to animal foodstuffs.

The pre-mix compositions of the invention contain the active ingredient or ingredients in admixture with a diluent or carrier, for example, ground corn, corn distillers dry grain, wheat shorts, corn cob meal, kaolin, talc, Fuller's earth, bentonite, calcium carbonate, attapulgus clay or ground oyster shells. The pre-mix compositions preferably contain between 0.1 and 50 percent by weight of active ingredient or ingredients and are formulated so as to be suitable for dilution with an animal foodstuff so as to provide a medicated animal foodstuff. As suitable animal foodstuffs there may be mentioned any of the foodstuff compositions known to be suitable for feeding domestic livestock, for example, commercial poultry mash, pig mash, crushed oats, soyabean meal, cottonseed oil meal, corn oil meal, wheatmeal, barley meal, fish meal, linseed meal, ground-nut meal, silage and biscuits. Medicated animal foodstuffs preferably contain between about 0.001 percent and about 1 percent by weight of the active ingredient or ingredients.

The oral compositions for use in humans are preferably in the form of tablets wherein the inert diluent or carrier is, for example, maize starch, lactose or alginic acid. The tablets preferably contain between 40 percent and 99 percent by weight of active ingredient(s) and more particularly between 70 percent and 85 percent by weight of active ingredient(s). The tablets may contain between 50 mg. and 1000 mg. of active ingredient(s). Compositions suitable for parenteral use may be for example in the form of solutions or suspensions in aqueous media or in non-toxic organic solvent media or dispersible powders suitable for the preparation of liquid suspensions.

The pharmaceutical and veterinary compositions may contain excipients as are known to the art to be useful or desirable in the preparation of such compositions, for example, wetting agents, dispersing agents, suspending agents, lubricating agents, sweetening agents, flavoring agents or coloring agents.

The pharmaceutical and veterinary compositions of the invention are valuable for the modification of the endocrine status in humans and in animals.

The pharmaceutical compositions of the invention are, for example, of value in the treatment of disorders of menstrual function, and in the treatment of menopausal symptoms such as facial flushing.

The veterinary compositions of the invention are valuable for use in domestic livestock such as birds, for example hens and turkeys, and animals, for example pigs, horses, cattle and sheep. The veterinary compositions are particularly valuable for use in the management of the sexual cycle of domestic livestock, for example they can be used to synchronize the heats (oestrus) of domestic livestock. In many areas the artificial insemination of pigs is uneconomic unless the oestrus cycle of the pigs can be controlled so that a large number of pigs are simultaneously in heat and are therefore capable of being inseminated at the same time. The veterinary compositions of the invention can be used to control the oestrus cycle of pigs and thus to ensure that the treated pigs are capable of being inseminated at the same time.

A further important use of the veterinary compositions of the invention is to delay the onset of puberty of hens. Delaying the onset of puberty of hens is known to be commercially advantageous and has previously been achieved by control of the amount of light to which the growing hens are exposed. This method requires expensive facilities such as windowless rearing houses with provision for the control of heat, light, humidity and ventilation. It has now been found that puberty in hens can be delayed by the more simple and inexpensive means of feeding the hens on the veterinary compositions of the invention which are in the form of medicated foodstuffs.

A further important use of the veterinary compositions of the invention is to bring about forced moulting of laying hens. It is known that the practice of keeping laying hens for more than one season of egg production can be very profitable provided that the technique of forced moulting is employed to ensure that individual members of the flock moult at the same time. After the forced moult the size and quality of the eggs produced by the hens are improved. It has now been found that forced moulting can be brought about by the simple and inexpensive means of feeding the hens on the veterinary compositions of the invention which are in the form of medicated foodstuffs.

The invention is illustrated but not limited by the following Examples in which the parts are by weight

EXAMPLE 1

Five hundred parts of $N^1$-α-methylallylthiocarbamoyl-$N^2$-methylthiocarbamoylhydrazine, 80 parts of maize starch, two parts of a condensate of ethylene oxide with sorbitan mono-oleate, and 10 parts of alginic acid are granulated with 550 parts of 10 percent aqueous maize starch paste and the granules are dried at 40°C. After blending with three parts of magnesium stearate in a suitable blender the dried granules are compressed into tablets, each containing 50 mg. or 250 mg. of $N^1$-α-methylallylthio-carbamoyl-$N^2$-methylthiocarbamoylhydrazine and which are suitable for oral administration.

In a similar manner the active ingredient can be replaced by an equal weight of any of $N^1$-β-methylallylthiocarbamoyl-$N^2$-methylthiocarbamoylhydrazine, $N^1$-γ-methylallylthiocarbamoyl-$N^2$-methylthiocarbamoylhydrazine, $N^1$-allylthiocarbamoyl-$N^2$, $N^2$-dimethylthiocarbamoylhydrazine or $N^1$-allylthiocarbamoyl-$N^2$-ethylthiocarbamoylhydrazine and there are likewise obtained tablets which are suitable for oral administration.

EXAMPLE 2

Fifty parts of $N^1$-α-methylallylthiocarbamoyl-$N^2$-methylthiocarbamoylhydrazine are ball milled for 20 hours with a solution of 0.5 part of a cetyl alcohol polyethylene oxide condensate and one part of sodium carboxymethylcellulose in 190 parts of water. There is thus obtained a suspension which can be diluted with water, if desired, and is suitable for oral administration.

In a similar manner, the active ingredient can be replaced by an equal weight of any of $N^1$-β-methylallylthiocarbamoyl-$N^2$-methylthiocarbamoylhydrazine, $N^1$-γ-methylallylthiocarbamoyl-$N^2$-methylthiocarbamoylhydrazine, $N^1$-allylthiocarbamoyl-$N^2$, $N^2$-dimethylthiocarbamoylhydrazine or $N^1$-allylthiocarbamoyl-$N^2$-ethylthiocarbamoylhydrazine and there is likewise obtained a suspension which can be diluted with water, if desired, and is suitable for oral administration.

EXAMPLE 3

Twenty-five parts of $N^1$-α-methylallylthiocarbamoyl-$N^2$-methylthiocarbamoylhydrazine are ground with 75 parts parts of Fuller's earth. There is thus obtained a pre-mix suitable for incorporating in the food for administration for domestic livestock.

The Fuller's earth in the above example may be replaced by any of bentonite, attapulgite clay, soyabean oil meal, corn oil meal or cottonseed oil meal, or by other individual foodstuff ingredients or by the foodstuffs themselves such as barley meal, wheat meal, maize meal or commercially available starter or grower rations for poultry or pigs, and there is likewise obtained a pre-mix suitable for incorporating into food for administration to domestic livestock.

The proportion of $N^1$-α-methylallylthiocarbamoyl-$N^2$-methylthiocarbamoylhydrazine in the pre-mixes described above may be varied as convenience requires to provide pre-mixes containing between 0.1 percent and 50 percent by weight of $N^1$-α-methylallylthiocarbamoyl-$N^2$-methyl-thiocarbamoylhydrazine.

In a similar manner the active ingredient can be replaced by an equal weight of any of $N^1$-β-methylallylthiocarbamoyl-$N^2$-methylthiocarbamoylhydrazine, $N^1$-γ-methylallylthiocarbamoyl-$N^2$-methylthiocarbamoylhydrazine, $N^1$-allylthiocarbamoyl-$N^2$:$N^2$-dimethylthiocarbamoylhydrazine or $N^1$-allylthiocarbamoyl-$N^2$-ethylthiocarbamoylhydrazine and there is likewise obtained a pre-mix suitable for incorporating into food for administration to domestic livestock.

EXAMPLE 4

A pre-mix is formed by mixing in a blender one part of $N^1$-α-methylallylthiocarbamoyl-$N^2$-methylthiocarbamoylhydrazine and 99 parts of commercial poultry mash. One part of this pre-mix is then intimately mixed with 99 parts of the said poultry mash. There is thus obtained a medicated foodstuff containing 0.01 percent of active ingredient and which is suitable for administration to poultry.

In a similar manner the active ingredient can be replaced by an equal weight of any of $N^1$-$\beta$-methylallylthiocarbamoyl-$N^2$-methylthiocarbamoylhydrazine, $N^1$-$\gamma$-methylallylthiocarbamoyl-$N^2$-methylthiocarbamoylhydrazine, $N^1$-allylthiocarbamoyl-$N^2$:$N^2$-dimethylthiocarbamoylhydrazine or $N^1$-allylthiocarbamoyl-$N^2$-ethylthiocarbamoylhydrazine and there is likewise obtained a medicated foodstuff suitable for administration to poultry.

EXAMPLE 5

One part of a pre-mix prepared according to Example 3 and containing 1 percent by weight of active ingredient is intimately mixed with 99 parts of crushed oats. There is thus obtained a medicated foodstuff containing 0.01 percent of active ingredient which is suitable for administration to domestic livestock.

The 99 parts of crushed oats can be replaced by an equal weight of any of soyabean meal, cottonseed oil meal, corn oil meal, wheat meal, barley meal, fish meal, linseed meal, ground-nut meal and silage and there is likewise obtained a medicated foodstuff suitable for administration to domestic livestock.

EXAMPLE 6

A group of 24 Sussex hens was fed from 15 weeks after hatching on a poultry mash containing 0.005 percent by weight of $N^1$-$\alpha$-methylallylthiocarbamoyl-$N^2$-methylthiocarbamoylhydrazine (I) until 23 weeks after hatching and were then fed on a poultry mash containing 0.01 percent by weight of (I) until 35 weeks after hatching. None of the hens in the group came into lay during this period. The hens were then fed on poultry mash which did not contain (I). The hens then came into lay rapidly; 58 percent of the group had laid by the end of the first week on the poultry mash which did not contain (I), and 96 percent of the group had laid by the end of the second week.

By contrast a control group of Sussex hens came into lay 17 weeks after hatching. Their rate of egg production had reached 50 percent 21 weeks after hatching and 76 percent 24 weeks after hatching, the rates of egg production being calculated on the basis of a standard rate of production of one egg per hen per day.

These results show that puberty of the group of 24 Sussex hens was delayed by the administration of (I) in the form of a medicated foodstuff.

EXAMPLE 7

Of a flock of 240 Sussex hens in their 49th week of lay, 144 hens (Group A) were fed on a diet containing 0.01 percent by weight of $N^1$-$\alpha$-methylallylthiocarbamoyl-$N^2$-methylthiocarbamoylhydrazine (I) for 1 week during which the remaining 96 hens (Group B), which served as a control group, were fed on an unmedicated diet. Groups A and B were subsequently fed on the unmedicated diet for the remainder of the experiment. The rate of egg production of Group A, calculated on the basis of a standard rate of production of 1 egg per hen per day was 13.8 percent during the week during which (I) was administered and 0.0 percent and 4.2 percent for the next two weeks respectively. In contrast the rates of egg production of Group B during the same three weeks were 43.5 percent, 32.6 percent and 30.0 percent respectively.

These results show that forced moulting of hens can be achieved by the simple means of feeding the hens on a medicated foodstuff containing 0.01 percent by weight of (I).

EXAMPLE 8

Foodstuff containing $N^1$-$\alpha$-methylallylthiocarbamoyl-$N^2$-methylthiocarbamoylhydrazine (I) was fed for 10 consecutive days to 28 female pigs at dosage rates of (I) of 1, 2, and 2.5 mg./kg./pig/day and at various stages of the normal oestrus cycle as shown in the table given below:

| No. of pigs (gilts) | Dose level of (I) mg./kg./pig/day | Interval between last oestrus & start of treatment with (I) | Average interval between withdrawal of medicated foodstuff & onset of oestrus | No. of corpora lutea (average) | No. of ova. (average) | No. of fertilised ova. (average) |
|---|---|---|---|---|---|---|
| 3 | 2.0 | 0–7 days | | 11.2 | 11.2 | 11 |
| 5 | 2.5 | 7–15 days | 5.2 days | 12 | | |
| 5 | 2.0 | 7–15 days | 5.2 days | 10.1 | 9.6 | 9.6 |
| 5 | 2.0 | 7–15 days | 5.6 days | 9.9 | 7.2 | 6.6 |
| 5 | 1.0 | 7–15 days | 5.1 days | 10.8 | 8.6 | 8.0 |
| 5 | 1.0 | 7–15 days | 5.2 days | 13.0 | 12.0 | 11.2 |

The foodstuff containing (I) was then withdrawn and the pigs were subsequently fed on a normal diet. Oestrus occurred at a short interval after the withdrawal of foodstuff containing (I) as shown in the table. The pigs were then artificially inseminated and 2 days later were slaughtered. Post-mortem examination of the pigs was then carried out to determine for each pig the number of corpora lutea present in the ovaries, the total number of ova (fertilised or unfertilised) present in the oviducts and the number of fertilised ova present in the oviducts. The results given in the table show that a high degree of synchronization of oestrus was achieved and that the fertility of the treated pigs was normal.

EXAMPLE 9

Foodstuff containing $N^1$-$\alpha$-methylallylthiocarbamoyl-$N^2$-methylthiocarbamoylhydrazine (I) was fed for 15 consecutive days to 16 female pigs at a dose level of (I) of 1 mg./kg./pig/day and at the various stages of the normal oestrus cycle shown in the table.

| No. of pigs (gilts) | Interval between last oestrus and start of treatment with (I) | Average interval between withdrawal of medicated foodstuff & onset of oestrus. | No. of corpora lutea (average) | No. of implantation sites in the uterus (average) | No. of viable embryos |
|---|---|---|---|---|---|
| 5 | 13–15 days | 6.2 days | 10 | 10 | 9.9 |
| 6 | 11–17 days | 6.7 days | 11.7 | 7.8 | 7.8 |
| 5 | 14–22 days | 7.4 days | 7.0 | 4.2 | 3.9 |

The pigs were then artificially inseminated and 20 days later were slaughtered. Post-mortem examination of the pigs was then carried out to determine for each pig the number of corpora lutea present in the ovaries, the number of implantation sites present in the uterus and the number of viable embryos present.

The results given in the table show that a high degree of synchronization of oestrus was achieved, and that the treated pigs were of normal fertility and capable of being artificially inseminated.

It will be appreciated that, in addition to the active components specifically referred to in the foregoing examples, there may be used any other compounds falling within the scope of the generic formula set forth above. This includes such compounds as $N^1$-allylthiocarbamoyl-$N^2$-n-propylthiocarbamolyhydrazine,
$N^1$-allylthiocarbamoyl-$N^2$-isopropylthiocarbamoylhydrazine,
$N^1$-allylthiocarbamoyl-$N^2$-n-butylthiocarbamoyl-hydrazine,
$N^1$-allylthiocarbamoyl-$N^2$-cyclohexylthiocarbamoylhydrazine,
$N^1$-methylthiocarbamoyl-$N^2$-n-propylthiocarbamoylhydrazine,
$N^1$-n-butylthiocarbamoyl-$N^2$-methylthiocarbamoylhydrazine,
$N^1$-ethylthiocarbamoyl-$N^2$-n-propylthiocarbamoylhydrazine,
$N^1$-n-propylthiocarbamoyl-$N^2$-isopropylthiocarbamoylhydrazine,
$N^1$-n-butylthiocarbamoyl-$N^2$-isopropylthiocarbamoylhydrazine,
$N^1$:$N^2$-bis($\alpha$-methylallylthiocarbamoyl)hydrazine,
$N^1$-allylthiocarbamoyl-$N^2$-di-n-propylthiocarbamoylhydrazine,
$N^1$-allylthiocarbamoyl-$N^2$-ethoxycarbonylcarbamoylhydrazine,
$N^1$:$N^2$-bis($\beta$-methylallylthiocarbamoyl)hydrazine,
$N^1$-allylthiocarbamoyl-$N^2$-$\alpha$-methylallylthiocarbamoylhydrazine,
$N^1$-allylthiocarbamoyl-$N^2$-$\beta$-methylallylthiocarbamoylhydrazine,
$N^1$-methylthiocarbamoyl-$N^2$-$\beta$-methylallylthiocarbamoylhydrazine,
$N^1$-$\alpha$-methylallylthiocarbamoyl-$N^2$-n-propylthiocarbamoyl-hydrazine, $N^1$-allylthiocarbamoyl-$N^2$-but-3-enylthio-carbamoylhydrazine, $N^1$-methylthiocarbamoyl-$N^2$-$\gamma$-methyl-allylthiocarbamoylhydrazine, $N^1$-allylthiocarbamoyl-$N^2$-$\gamma$-methylallylthiocarbamoylhydrazine, $N^1$-but-3-enylthio-carbamoyl-$N^2$-methylthiocarbamoylhydrazine, $N^1$-allyl-thiocarbamoyl-$N^2$-benzylthiocarbamoylhydrazine,
$N^1$-allylthiocarbamoyl-$N^2$-sec.-butylthiocarbamoylhydrazine,
$N^1$-allylthiocarbamoyl-$N^2$-isobutylthiocarbamoylhydrazine,
$N^1$-allylthiocarbamoyl-$N^2$-tert.-butylthiocarbamoylhydrazine,
$N^1$-ethylthiocarbamoyl-$N^2$-tert.-butylthiocarbamoylhydrazine,
$N^1$-$\beta$-methylallylthiocarbamoyl-$N^2$-ethylthiocarbamoyl-hydrazine, $N^1$-ethylthiocarbamoyl-$N^2$-$\alpha$-methylallylthio-carbamoylhydrazine, $N^1$-sec.-butylthiocarbamoyl-$N^2$-$\alpha$-methylallylthiocarbamoyl-hydrazine, $N^1$-dimethyl-thiocarbamoyl-$N^2$-$\beta$-methylallylthiocarbamoylhydrazine,
$N^1$-allylthiocarbamoyl-$N^2$-3-methylthiopropylthiocarbamoyl-hydrazine, $N^1$-allylthiocarbamoyl-$N^2$-3-methoxypropyl-thiocarbamoylhydrazine, $N^1$-3-methoxypropylthio-carbamoyl-$N^2$-methylthiocarbamoylhydrazine, $N^1$-$N^2$-bis-3-methoxypropylthiocarbomoylhydragine, $N^1$-$\alpha$-$\gamma$-dimethylallylthiocarbamoyl-$N^2$-ethylthiocarbamoyl-hydrazine, $N^1$-$\alpha$-$\gamma$-dimethylallylthiocarbamoyl-$N^2$-methylthiocarbamoylhydrazine, $N^1$-allylthiocarbamoyl-$N^2$-$\alpha$-:$\gamma$-dimethylallylthiocarbamoylhydrazine, $N^1$-$\alpha$-n-propylallylthiocarbamoyl-$N^2$ methylthiocarbamoyl-hydrazine, $N^1$-allylthiocarbamoyl-$N^2$-$\alpha$-propylallyl-thiocarbamoylhydrazine, $N^1$-methylthiocarbamoyl-$N^2$-$\gamma$-n-propylallylthiocarbamoylhydrazine, $N^1$-allylthio-carbamoyl-$N^2$-$\gamma$-n-propylallylthiocarbamoylhydrazine, $N^1$-$\alpha$-ethyl-$\alpha$-methylallylthiocarbamoyl-$N^2$-methylthio-carbamoylhydrazine, $N^1$-ethylthiocarbamoyl-$N^2$-$\alpha$-ethyl--$\beta$-methylthiocarbamoylhydrazine, $N^1$-allylthiocar-bamoyl-$N^2$-$\alpha$-ethyl-$\beta$-methylallylthiocarbamoyl-hydrazine, $N^2$-allylthiocarbamoyl-$N^2$-pent-4-ethylthiocarbamoylhydrazine, $N^1$-$\gamma$-ethylallylthiocar-bamoyl-$N^2$-methylthiocarbamoyl-hydrazine, $N^1$-$\alpha$-ethylallylthiocarbamoyl-$N^2$-methyl-thiocarbamoyl-hydrazine, $N^1$-allylthiocarbamoyl-$N^2$-2',4',5'-trichlor-obenzylthiocarbamoylhydrazine, $N^1$-allylthiocarba-moyl-$N^2$-p-methoxybenzylthiocarbamoyl-hydrazine, $N^1$:$N^2$-bis-n-propylthiocarbamoylhydrazine, $N^1$-diallylthiocarbamoyl-$N^2$-thiocarbamoylhydrazine, These compounds are prepared as described in Ser. No. 32,589 and may also be utilized in the manner referred to above.

We claim:

1. A pharmaceutical or veterinary composition for oral or parenteral use to modify the endocrine status for management of the sexual cycle or reproductivity of humans or domestic animals which comprises, as active ingredient, an amount of at least one hydrazine derivative of the formula:

$$R_1NH \cdot CS \cdot HN \cdot NH \cdot CS \cdot NR_2R_3$$

wherein of the substituents $R_1$, $R_2$ and $R_3$, one is selected from the group consisting of alkyl of one to four carbon atoms and alkenyl of up to six carbon atoms, and of the remaining two substituents, one is selected from the group consisting of hydrogen, alkyl of six to four carbon atoms, alkenyl of three to six carbon atoms, benzyl, 2,4,5-trichlorobenzyl, p-methoxybenzyl, cyclohexyl, gamma-methoxy-n-propyl and gamma-methylthio-n-propyl, and the other is selected from the group consisting of alkyl of one to four carbon atoms, alkenyl of up to six carbon atoms, benzyl, 2,4,5-trichlorobenzyl, p-methoxybenzyl, cyclohexyl, gamma-methoxy-n-propyl and gamma-methylthio-n-propyl, provided that when $R_2$ stands for hydrogen and $R_1$ has a value chosen from methyl, ethyl and allyl, $R_3$ is different from $R_1$ and provided further than when $R_1$ is methyl and $R_2$ is hydrogen, $R_3$ is other than allyl, in admixture with a non-toxic, pharmaceutically-acceptable inert liquid carrier including a dispersing agent or a solid carrier, the amount of said derivative being effective for said use 2. A composition as claimed in claim 1 wherein $R_2$ is alkenyl of up to six carbon atoms, $R_2$ is hydrogen and $R_3$ is alkyl of up to four carbon atoms.

3. A composition as claimed in claim 1 wherein $R_1$ is alkenyl of up to six carbon atoms and $R_2$ and $R_3$ are both alkyl each containing up to four carbon atoms.

4. A composition as claimed in claim 1 wherein $R_1$ is hydrogen and $R_2$ and $R_3$ are both alkenyl, each containing up to six carbon atoms.

5. A composition as claimed in claim 1 wherein $R_1$ is alkyl of from 1 to four carbon atoms, $R_2$ is hydrogen and $R_3$ is tertiary butyl.

6. A composition as claimed in claim 1 wherein the active ingredient is selected from the group consisting of $N^1$-α-methylallyl-thiocarbamoyl-$N^2$-methylthiocarbamolhydrazine, $N^1$-β-methylallylthiocarbamoyl-$N^2$-methylthiocarbamoylhydrazine, $N^1$-γ-methylallylthiocarbamoyl-$N^2$-methylthiocarbamoylhydrazine, $N^1$-allylthiocarbamoyl-$N^2$:$N^2$-dimethylthiocarbamoylhydrazine and $N^1$-allylthiocarbamoyl-$N^2$-ethylthiocarbamoylhydrazine.

7. A composition according to claim 1 in tablet or capsule form for oral use.

8. A composition as claimed in claim 1 which is an oral composition in a form selected from the group consisting of tablets, capsules, solutions and suspensions in aqueous media, solutions and suspensions in non-toxic organic solvent media, dispersible powders suitable for the preparation of liquid suspensions and medicated animal foodstuffs.

9. A composition as claimed in claim 8 which is a medicated animal foodstuff containing between about 0.001 percent and about 1 percent by weight of the active ingredient.

10. A composition as claimed in claim 1 which is for parenteral use and which is in a form selected from the group consisting of solutions and suspensions in aqueous media, solutions and suspensions in non-toxic organic solvent media and dispersible powders suitable for the preparation of liquid suspensions.

11. A composition according to claim 1 in tablet form and containing between 50 mg and 1000 mg. of active ingredient.

12. A process for the modification of the endocrine status of humans and of animals to manage the sexual cycle or reproductivity thereof which comprises administering thereto an endocrine status modifying amount of a hydrazine derivative of the formula:

$$R_1NH \cdot CS \cdot NH \cdot NH \cdot CS \cdot NR_2R_3$$

wherein of the substituents $R_1$, $R_2$, and $R_3$, one is selected from the group consisting of alkyl of one to four carbon atoms and alkenyl of up to six carbon atoms, and of the remaining two substituents, one is selected from the group consisting of hydrogen, alkyl of one to four carbon atoms, alkenyl of three to six carbon atoms, benzyl, 2,4,5-trichlorobenzyl, p-methoxybenzyl, cyclohexyl, gamma-methoxy-n-propyl and gamma-methylthio-n-propyl, and the other is selected from the group consisting of alkyl of one to four carbon atoms, alkenyl of up to six carbon atoms, benzyl, 2,4,5-trichlorobenzyl, p-methoxybenzyl, cyclohexyl, gamma-methoxy-n-propyl and gamma-methylthio-n-propyl, provided that when $R_2$ stands for hydrogen and $R_1$ has a value chosen from methyl, ethyl and allyl, $R_3$ is different from $R_1$ and provided further that when $R_1$ is methyl and $R_2$ is hydrogen, $R_3$ is other than allyl.

13. Process as claimed in claim 12 wherein the hydrazine derivative is selected from the group consisting of $N^1$-α-methylallylthiocarbamoyl-$N^2$-methylthiocarbamoylhydrazine, $N^1$-β-methyl-allylthiocarbamoyl-$N^2$-methylthiocarbamoylhydrazine, $N^1$-γ-methylallylthiocarbamoyl-$N^2$-methylthiocarbamoylhydrazine, $N^1$-allylthiocarbamoyl-$N^2$:$N^2$-dimethylthiocarbamoylhydrazine and $N^1$-allythiocarbamoyl-$N^2$-ethylthiocarbamoylhydrazine.

14. Process for managing the sexual cycle of poultry or domestic livestock which comprises administering thereto a sexual cycle managing amount of a hydrazine derivative of the formula:

$R_1NH \cdot CS \cdot NH \cdot NH \cdot CS \cdot NR_2R_3$ wherein of the substituents $R_1$, $R_2$, and $R_3$, one is selected from the group consisting of alkyl of one to four carbon atoms and alkenyl of up to six carbon atoms, and of the remaining two substituents, one is selected from the group consisting of hydrogen, alkyl of one to four carbon atoms, alkenyl of up to six carbon atoms, benzyl, 2,4,5-trichlorobenzyl, p-methoxybenzyl, cyclohexyl, gamma-methoxy-n-propyl and gamma-methylthio-n-propyl, and the other is selected from the group consisting of alkyl of one to four carbon atoms, alkenyl of up to six carbon atoms, benzyl, 2,4,5-trichlorobenzyl, p-methoxybenzyl, cyclohexyl, gamma-methoxy-n-propyl and gamma-methylthio-n-propyl, provided that when $R_2$ stands for hydrogen and $R_1$ has a value chosen from methyl, ethyl and allyl, $R_3$ is different from $R_1$ and provided further that when $R_1$ is methyl and $R_2$ is hydrogen, $R_3$ is other than allyl.

15. Process for the synchronization of oestrus in domestic livestock which comprises administering thereto an effective amount of a hydrazine derivative of the formula:

$$R_1NH \cdot CS \cdot NH \cdot NH \cdot CS \cdot NR_2R_3$$

wherein of the substituents $R_1$, $R_2$, and $R_3$, one is selected from the group consisting of alkyl of one to four carbon atoms and alkenyl of up to six carbon atoms, and of the remaining two substituents, one is selected from the group consisting of hydrogen, alkyl of one to four carbon atoms, alkenyl of up to six carbon atoms, benzyl, chlorobenzyl, methoxybenzyl, cyclohexyl, gamma-methoxy-n-propyl and gamma-methylthio-n-propyl, and the other is selected from the group consisting of alkyl of one to four carbon atoms, alkenyl of up to six carbon atoms, benzyl, 2,4,5-trichlorobenzyl, p-methoxybenzyl, cyclohexyl, gamma-methoxy-n-propyl and gamma-methylthio-n-propyl, provided that when $R_2$ stands for hydrogen and $R_1$ has a value chosen from methyl, ethyl and allyl, $R_3$ is different from $R_1$ and provided further that when $R_1$ is methyl and $R_2$ is hydrogen, $R_3$ is other than allyl, the amount of said derivative being sufficient to effect synchronization of said oestrus.

16. Process as claimed in claim 15 wherein the domestic livestock are pigs.

17. Process for delaying the onset of puberty of hens which comprises administering thereto an effective amount of a hydrazine derivative of the formula:

$$R_1NH \cdot CS \cdot NH \cdot NH \cdot CS \cdot NR_2R_3$$

wherein of the substituents $R_1$, $R_2$, and $R_3$, one is selected from the group consisting of alkyl of one to four carbon atoms and alkenyl of up to six carbon atoms, and of the remaining two substituents, one is selected from the group consisting of hydrogen, alkyl of one to four carbon atoms, alkenyl of up to six carbon atoms, benzyl, 2,4,5-trichlorobenzyl, p-methoxybenzyl, cyclohexyl, gamma-methoxy-n-propyl and gamma-methylthio-n-propyl, and the other is selected from the group consisting of alkyl of one to four carbon atoms, alkenyl of up to six carbon atoms, benzyl, chlorobenzyl, methoxybenzyl, cyclohexyl, gamma-methoxy-n-propyl and gamma-methylthio-n-propyl, provided that when $R_2$ stands for hydrogen and $R_1$ has a value chosen from methyl, ethyl and allyl, $R_3$ is different from $R_1$ and provided further that when $R_1$ is methyl and $R_2$ is hydrogen, $R_3$ is other than allyl, the amount of said derivative being sufficient to delay the onset of puberty.

18. Process for bringing about forced molting of laying hens which comprises administering thereto an effective amount of a hydrazine derivative of the formula:

wherein of the substituents $R_1$, $R_2$, and $R_3$, one is selected from the group consisting of alkyl of one to four carbon atoms and alkenyl of up to six carbon atoms, and of the remaining two substituents, one is selected from the group consisting of hydrogen, alkyl of four to four carbon atoms, alkenyl of up to six carbon atoms, and of the remaining two substituents, one is selected from the group consisting of hydrogen, alkyl of one to four carbon atoms, alkenyl of up to six carbon atoms, benzyl, chlorobenzyl, methoxybenzyl, cyclohexyl, gamma-methoxy-n-propyl and gamma-methylthio-n-propyl, and the other is selected from the group consisting of alkyl of one to four carbon atoms, alkenyl of up to six carbon atoms, benzyl, 2,4,5-trichlorobenzyl-p-methoxybenzyl, cyclohexyl, gamma-methoxy-n-propyl and gamma-methylthio-n-propyl, provided that when $R_2$ stands for hydrogen and $R_1$ has a value chosen from methyl, ethyl and allyl, $R_3$ is different from $R_1$ and provided further that when $R_1$ is methyl and $R_2$ is hydrogen, $R_3$ is other than allyl, the amount of said derivative being sufficient to bring about forced moulting.

19. A medicinal pre-mix composition to modify the endocrine status for management of the sexual cycle or reproductivity in animals for addition to animal foodstuffs, which comprises, as active ingredient, from 0.1 percent to 50 percent by weight of at least one hydrazine derivative of the formula:

wherein of the substituents $R_1$, $R_2$, and $R_3$, one is selected from the group consisting of alkyl of up to four carbon atoms and alkenyl of up to six carbon atoms, and of the remaining two substituents, one is selected from the group consisting of hydrogen, alkyl of up to four carbon atoms, alkenyl of three to six carbon atoms, benzyl, 2,4,5-trichlorobenzyl, p-methoxybenzyl, cyclohexyl, gamma-methoxy-n-propyl and gamma-methylthio-n-propyl, and the other is selected from the group consisting of alkyl of one to four carbon atoms, alkenyl of up to six carbon atoms benzyl, 2,4,5-trichlorobenzyl, p-methoxybenzyl, cyclohexyl, gamma-methoxy-n-propyl and gamma-methylthio-n-propyl, provided that when $R_2$ stands for hydrogen and $R_1$ has a value chosen from methyl, ethyl and allyl, $R_3$ is different from $R_1$ and provided further then when $R_1$ is methyl and $R_2$ is hydrogen, $R_3$ is other than allyl, in admixture with a non-toxic, carrier selected from the group consisting of ground corn, corn distillers dry grain, wheat shorts, corn cob meal, kaolin, talc, Fuller's earth, bentonite, calcium carbonate, attapulgus clay and ground oyster shells.

* * * * *